(12) United States Patent
Yoshizaki (10) Patent No.: US 11,383,567 B2
(45) Date of Patent: Jul. 12, 2022

(54) VEHICLES HAVING A RETRACTABLE HITCH

(71) Applicant: Toyota Motor Engineering & Manufacturing North America, Inc., Erlanger, KY (US)

(72) Inventor: Coh Yoshizaki, Wixom, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 934 days.

(21) Appl. No.: 15/788,513

(22) Filed: Oct. 19, 2017

(65) Prior Publication Data

US 2019/0118595 A1    Apr. 25, 2019

(51) Int. Cl.
| | | |
|---|---|---|
| B60D 1/62 | (2006.01) | |
| B60D 1/40 | (2006.01) | |
| B60D 1/24 | (2006.01) | |
| B60D 1/06 | (2006.01) | |
| B60D 1/38 | (2006.01) | |

(52) U.S. Cl.
CPC ............. B60D 1/62 (2013.01); B60D 1/06 (2013.01); B60D 1/065 (2013.01); B60D 1/246 (2013.01); B60D 1/38 (2013.01); B60D 1/40 (2013.01)

(58) Field of Classification Search
CPC ... B60D 1/62; B60D 1/06; B60D 1/38; B60D 1/065; B60D 1/246; B60D 1/40
See application file for complete search history.

(56) References Cited

U.S. PATENT DOCUMENTS

| | | | | |
|---|---|---|---|---|
| 2,202,221 A | * | 5/1940 | Miller | B60T 7/20 188/112 R |
| 3,663,039 A | * | 5/1972 | Morgan | B62D 13/06 280/408 |
| 3,698,739 A | * | 10/1972 | Szymanski | B60D 1/40 280/479.3 |
| 3,811,020 A | * | 5/1974 | Johnson | F16H 61/22 200/61.88 |
| 3,963,085 A | * | 6/1976 | Vinton | B60K 17/3467 180/247 |
| 3,979,138 A | * | 9/1976 | George | B60D 1/40 280/478.1 |
| 4,271,401 A | * | 6/1981 | Meo | B60D 1/28 200/51.1 |
| 4,744,583 A | * | 5/1988 | Blackwood | B60D 1/40 280/479.3 |
| 5,421,600 A | * | 6/1995 | Jones | B60D 1/36 280/428 |
| 5,551,523 A | * | 9/1996 | Berg | B60K 28/04 180/273 |

(Continued)

FOREIGN PATENT DOCUMENTS

GB    2527110 A    7/2014

*Primary Examiner* — Jeff A Burke
*Assistant Examiner* — Kyle T Johnson
(74) *Attorney, Agent, or Firm* — Dinsmore & Shohl LLP (57) ABSTRACT

A vehicle having a retractable towing hitch includes a towing hitch assembly. The towing hitch assembly includes a coupler portion. The coupler portion is configured to be movable relative to a bumper of the vehicle such that the coupler portion is positioned farther from the bumper when the coupler portion is in an extended position than when the coupler portion is in a towing position and a retraction mechanism.

18 Claims, 9 Drawing Sheets

(56) References Cited

U.S. PATENT DOCUMENTS

| | | | | |
|---|---|---|---|---|
| 5,816,367 A | * | 10/1998 | Lilja | F01D 25/285 |
| | | | | 187/244 |
| 5,967,539 A | * | 10/1999 | Digman | B60D 1/28 |
| | | | | 280/480 |
| 5,970,619 A | | 10/1999 | Wells | |
| 5,975,552 A | * | 11/1999 | Slaton | B60D 1/38 |
| | | | | 280/478.1 |
| 6,598,897 B1 | * | 7/2003 | Patti | B60D 1/06 |
| | | | | 280/478.1 |
| 6,712,380 B1 | * | 3/2004 | Edens | B60D 1/065 |
| | | | | 280/474 |
| 6,974,146 B2 | * | 12/2005 | Abair | B60D 1/246 |
| | | | | 280/470 |
| 7,253,721 B2 | * | 8/2007 | Flohr | B60D 1/58 |
| | | | | 280/504 |
| 7,290,755 B1 | * | 11/2007 | Thibodeaux | B60D 1/38 |
| | | | | 254/323 |
| 8,016,314 B2 | * | 9/2011 | Visser | B60D 1/58 |
| | | | | 280/507 |
| 9,637,052 B2 | | 5/2017 | Whitehead et al. | |
| 2004/0061308 A1 | * | 4/2004 | McCarron | B60P 3/1083 |
| | | | | 280/478.1 |
| 2007/0216136 A1 | | 9/2007 | Dietz | |
| 2008/0262689 A1 | * | 10/2008 | Sayers | B62D 11/24 |
| | | | | 701/70 |
| 2012/0080866 A1 | * | 4/2012 | West | B60D 1/015 |
| | | | | 280/476.1 |
| 2015/0137482 A1 | * | 5/2015 | Woolf | B60D 1/06 |
| | | | | 280/448 |
| 2016/0280023 A1 | * | 9/2016 | Olesen | B60D 1/62 |
| 2016/0304122 A1 | | 10/2016 | Continental | |
| 2019/0118595 A1 | * | 4/2019 | Yoshizaki | B60D 1/62 |

\* cited by examiner

VEHICLES HAVING A RETRACTABLE HITCH

TECHNICAL FIELD

The present specification generally relates to vehicles capable of towing towable items and, more specifically, vehicles having retractable hitches.

BACKGROUND

Vehicles may be equipped with towing hitches to tow various towable items (e.g., boats, RVS, trailers, etc.). However, it may be difficult to properly align a coupler of a towable item to the ball of a towing hitch. It may take several tries before proper alignment is made. Hence, attaching a towable item to a towing hitch of a vehicle is often a two-person job.

Accordingly, a need exists for alternative vehicles having towing hitch assemblies that make it easier to couple a towable item to a vehicle hitch.

SUMMARY

In one embodiment, a vehicle includes a towing hitch assembly. The towing hitch assembly includes a coupler portion. The coupler portion is configured to be movable relative to a bumper of the vehicle such that the coupler portion is positioned farther from the bumper when the coupler portion is in an extended position than when the coupler portion is in a towing position.

In another embodiment, a vehicle includes a towing hitch assembly and a retraction mechanism. The towing hitch assembly includes a coupler portion and a cable having a first end and a second end. The coupler portion is configured to be movable relative to a bumper of the vehicle such that the coupler portion is positioned farther from the bumper when the coupler portion is in an extended position than when the coupler portion is in a towing position and a retraction mechanism. The retraction mechanism includes a winding actuator configured to wind the cable such that a distance between the coupler portion and the bumper of the vehicle is reduced when the coupler portion is moved from the extended position to the towing position. The first end of the cable is coupled to the coupler portion and the second end of the cable is coupled to the retraction mechanism.

In yet another embodiment, a vehicle includes a towing hitch assembly and a retraction mechanism. The towing hitch assembly includes a coupler portion and a toothed rack that is at least one of formed on the coupler portion and coupled to the coupler portion. The coupler portion is configured to be movable relative to a bumper of the vehicle such that the coupler portion is positioned farther from the bumper when the coupler portion is in an extended position than when the coupler portion is in a towing position. The retraction mechanism includes a gear configured to engage the toothed rack to move the coupler portion to reduce a distance between the coupler portion and the bumper of the vehicle when the coupler portion is moved from the extended position to the towing position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of vehicles having a retractable towing hitch assembly, as provided herein, allow a user to easily couple a towable item to the towing hitch assembly of the vehicle. For example, a towing hitch assembly as described herein can be extended to an extended position wherein it can be pre-coupled to a coupler of a towable item. The vehicle can then retract the towing hitch assembly from the extended position so as to pull the towing hitch assembly, and the towable item, to a towing position wherein the vehicle can tow the towable item. Hence a vehicle operator can more easily align the towing hitch assembly and the towable item saving time and energy.

As used herein the phrase "towable item" refers to any item that may be attached to a vehicle by a towing hitch. This may include, but is not limited to, trailers, campers, boats, and the like Referring now to FIG. 1A, a vehicle 10 having a towing hitch assembly 100 is schematically illustrated. Though the vehicle 10 is depicted as an automobile (e.g., a truck), the vehicle 10 may be any passenger vehicle such as, for example, a terrestrial, aquatic, and/or airborne vehicle.

Figure 1A:
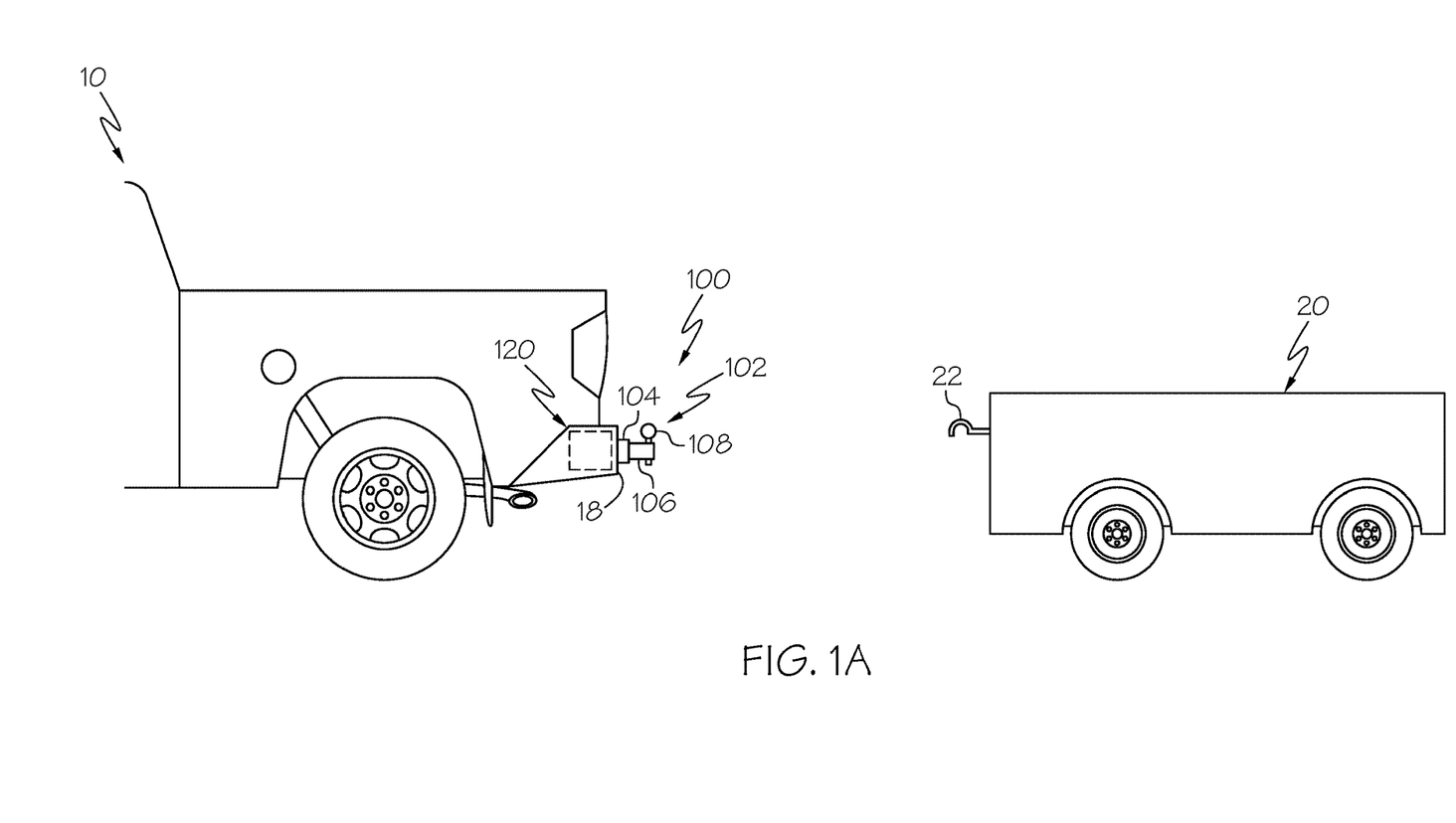
FIG. 1A depicts a vehicle having a towing hitch assembly uncoupled from a towable item, according to one or more embodiments shown and described herein.

The towing hitch assembly 100 is illustrated as being coupled to a rear of the vehicle 10. However, it is contemplated the towing hitch assembly 100 could be coupled to other regions of the vehicle 10. For example, the towing hitch assembly 100 may be coupled to a front of the vehicle 10. The towing hitch assembly 100 generally includes a receiver 104 mounted on a frame of the vehicle for receiving and securing a coupler portion 102 to the vehicle 10. As will be described in greater detail, the towing hitch assembly 100 also includes a retraction mechanism 120, schematically illustrated in the figures, that is configured to retract the coupler portion 102 to a towing position.

FIG. 1A illustrates the coupler portion 102 docked within the receiver 104 without a towable item 20 attached thereto. As will be described in greater detail, the coupler portion 102 is configured to be movable relative to a bumper 18 of the vehicle 10 such that the coupler portion 102 is positioned farther from the bumper 18 when the coupler portion 102 is in an extended position (see FIGS. 1B and 1C) than when the coupler portion is in a towing position (see FIG. 1D). The coupler portion 102 includes an elongate frame 106 that is insertable into the receiver 104 and may be removably secured to the receiver 104 through a locking mechanism 130 such as illustrated in FIGS. 2-5B (e.g., a pin, a fastener, or the like). Coupled to the elongate frame 106 may be a towing hitch ball 108. The towing hitch ball 108 may be coupled to the elongate frame 106 through a variety of methods including welding, fastening, and the like. In some embodiments, the towing hitch ball 108 may be interchangeable with other sized and shaped towing hitch balls. It is noted that though the coupler portion 102 is illustrated in the various figures as having a particular shape, the coupler portion 102 may generally comprise a variety of shapes. For example, the elongate frame 106 may comprise various bends that provide a particular height platform for the towing hitch ball 108 to extend from. For example, a towing hitch for towing a boat trailer may need a vertically higher or lower towing hitch ball than a utility trailer.

Figure 1B:
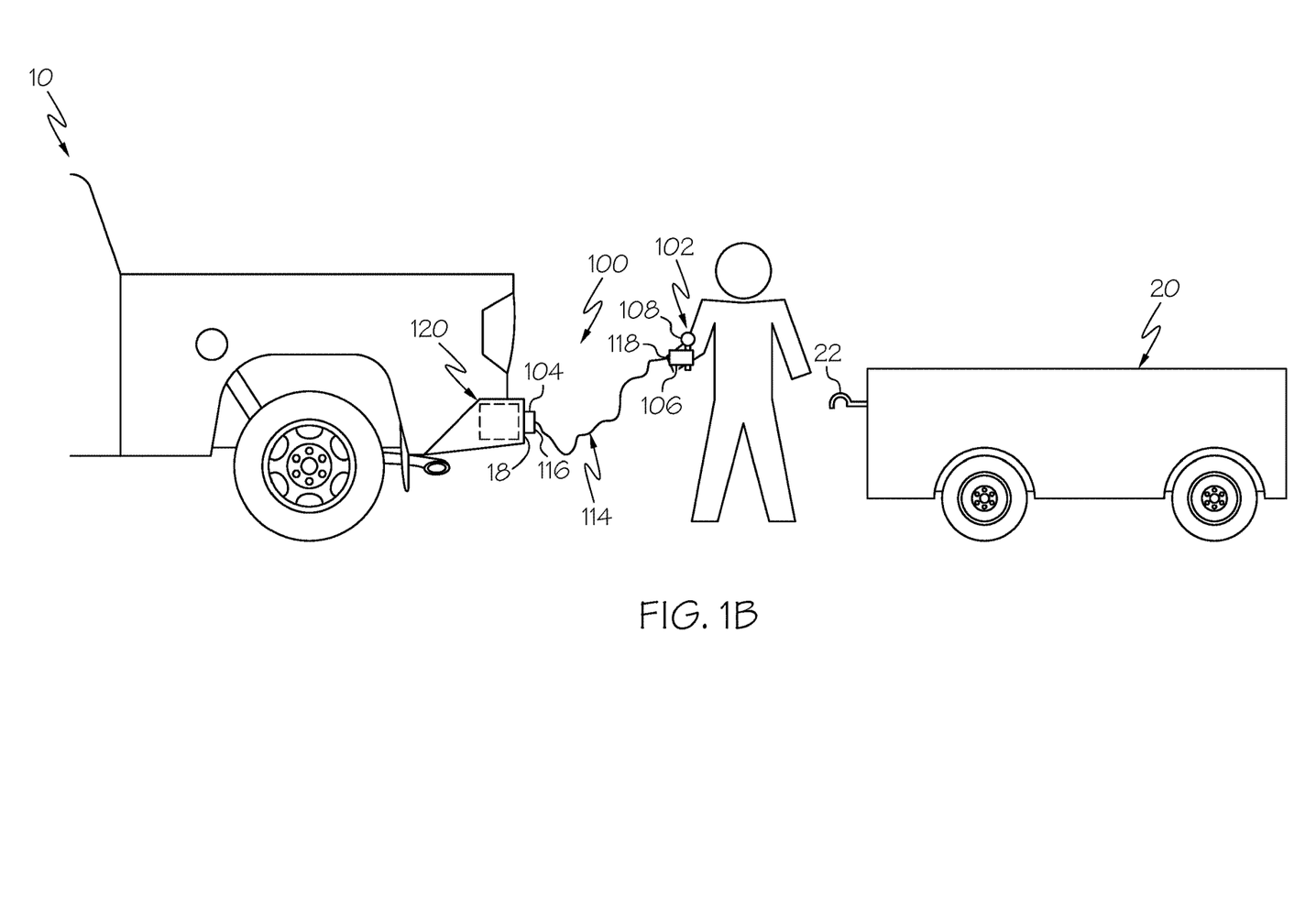
FIG. 1B depicts an individual moving a coupler portion of the towing hitch assembly of FIG. 1A to an extended position, according to one or more embodiments shown and described herein.
Figure 1C:
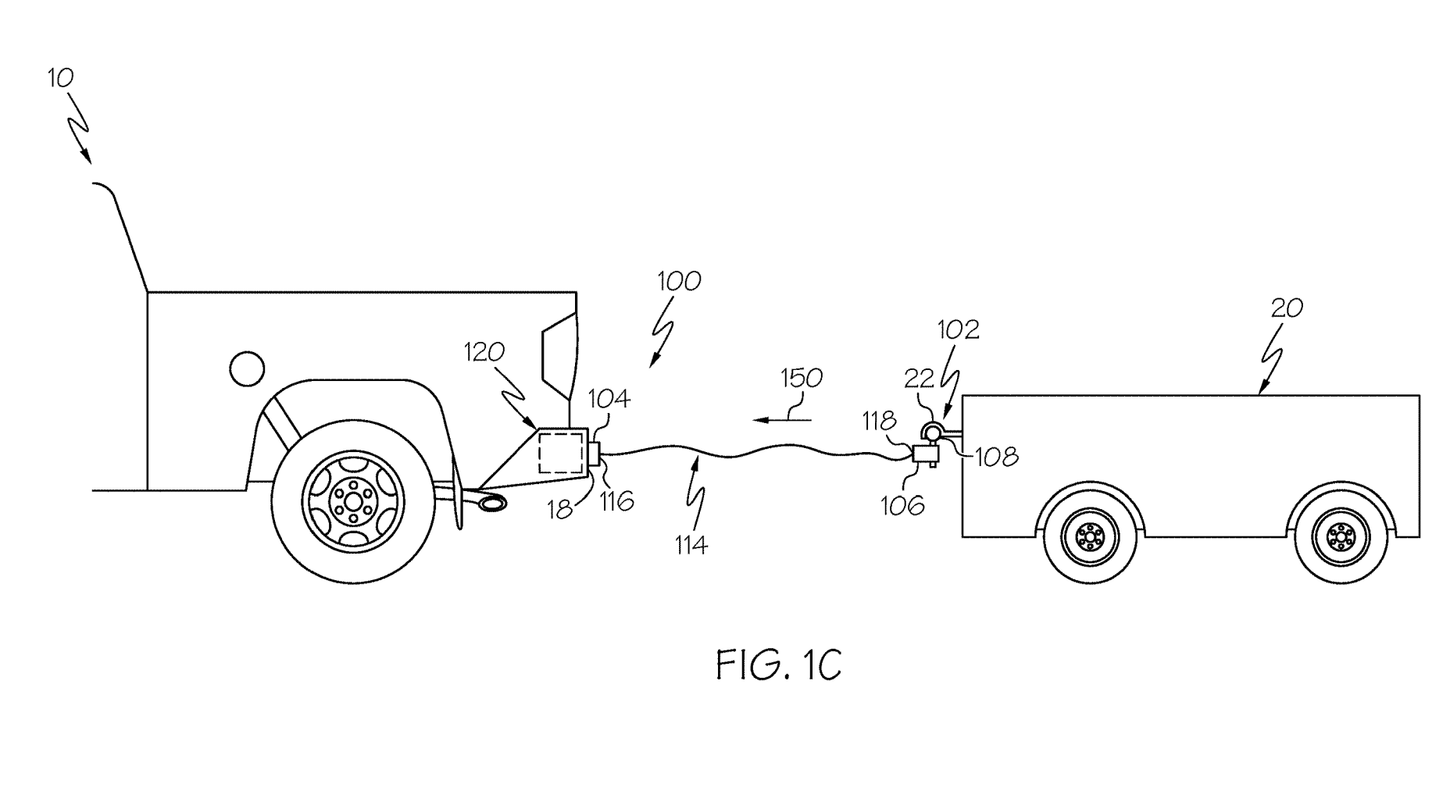
FIG. 1C depicts the coupler portion of the towing hitch assembly of FIG. 1A coupled to a coupler of the towable item, according to one or more embodiments shown and described herein.
Figure 1D:
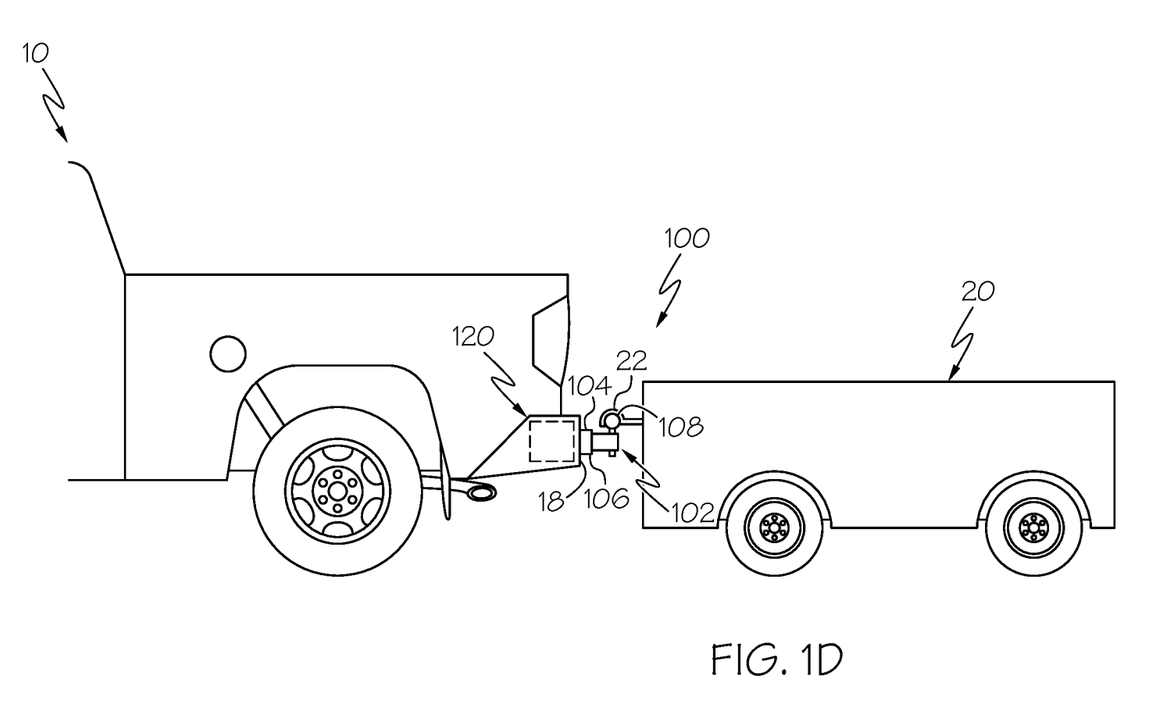
FIG. 1D depicts the coupler portion of FIG. 1C retracted to a towing position with the towable item coupled thereto, according to one or more embodiments shown and described herein.

Referring now to FIG. 1B, the coupler portion 102 is illustrated as being pulled to an extended position a distance from a bumper 18 of the vehicle 10 by a user. It is noted that though the entire coupler portion 102 is illustrated as being pulled to the extended position, in some embodiments, only a portion of the coupler portion 102 may be pulled to the extended position. For example, in some embodiments, only the towing hitch ball 108 may be pulled to the extended position. To retract the coupler portion 102, a retraction mechanism 120 is operatively coupled to the coupler portion 102 to retract the coupler portion 102 from an extended position (such as shown in FIGS. 1B and 1C) to a towing position (such as shown in FIG. 1D). In one embodiment, and as will be described in greater detail herein, the retraction mechanism 120 may include a cable 114 having a first end 118 coupled to the coupler portion 102 and a second end 116 coupled to vehicle 10. It is noted that the coupler portion 102 need not extend very far. In some embodiments, the coupler portion may extend for example, about 20 cm in length. However, it is contemplated that the length that the coupler portion 102 may extend to a distance greater or less than 20 cm, for example +/−10 cm.

Referring now to FIG. 1C, once in the extended position, the coupler portion 102 can be coupled to a coupler 22 of a towable item 20. For example, where the coupler portion 102 includes a towing hitch ball 108, the coupler 22 of the towable item 20 may be secured to the towing hitch ball 108. For example, the coupler 22 of the towable item 20 may be configured to be tightened on to, or otherwise securely coupled to, the towing hitch ball 108 to secure the towable item 20 to the towing hitch ball 108 of the coupler portion 102.

Once secured, the retraction mechanism 120, which is operatively coupled to the coupler portion 102, may retract the coupler portion 102 to a towing position in a direction 150 toward the vehicle 10, as shown in FIG. 1D. That is, the coupler portion 102 can be retracted by the retraction mechanism 120 into the receiver 104 and secured thereto. For example, retraction mechanism 120 may include a winch or motor to wind up the cable 114 to retract the coupler portion 102 into the receiver 104. However, as will be described in greater detail herein, the retraction mechanism 120 may have many different configurations. The retraction mechanism 120 may, by retracting the coupler portion 102, also pull the towable item 20 closer to the vehicle 10.

Figure 2:
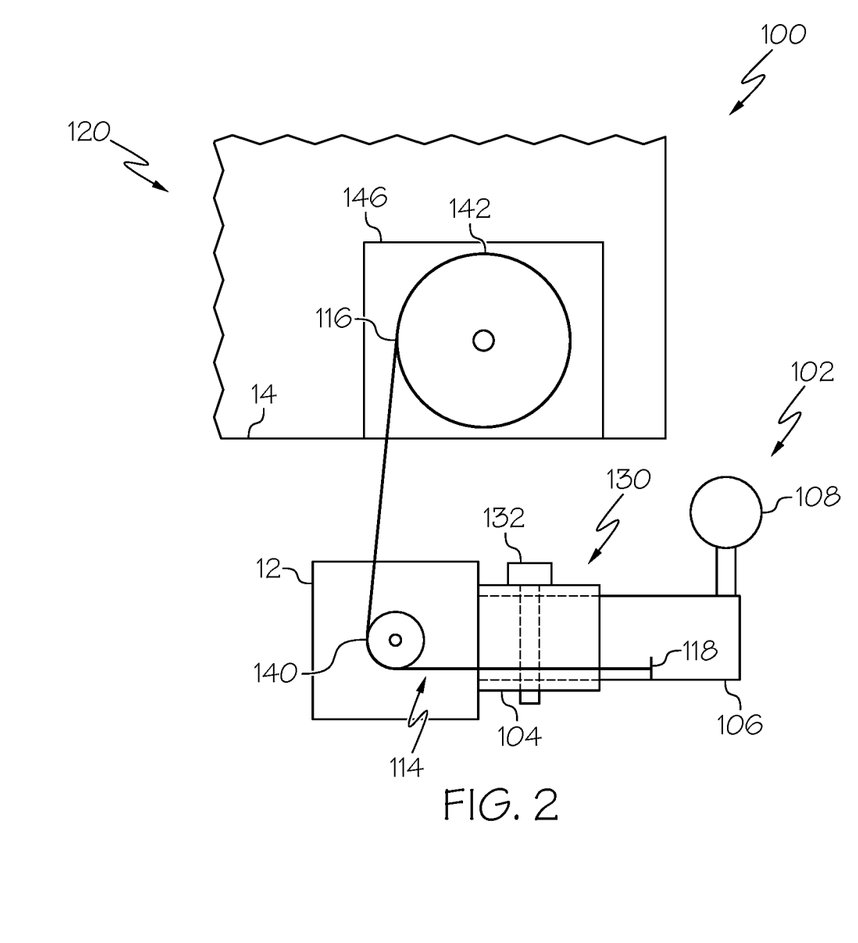
FIG. 2 depicts a towing hitch assembly, according to one or more embodiments shown and described herein.

Referring now to FIG. 2, a side elevational view of an embodiment of the towing hitch assembly 100 is schematically depicted. The retraction mechanism 120 includes a cable 114 coupled to the coupler portion 102 at a first end 118 and the retraction mechanism 120 a second end 116. The cable 114 may be any type of cable capable of transmitting force to coupler portion 102 including, for example, a rope or chain. In some embodiments the cable 114 may be strong enough to move a towable item 20 that may be coupled to the coupler portion 102 toward the vehicle 10 as the retraction mechanism 120 winds up the cable 114. The cable 114 may be coupled to the coupler portion 102 through any conventional joining techniques including knots, pins, fasteners, brackets, adhesives, welding, brazing, and the like.

To facilitate retraction of the coupler portion 102 from an extended position to a towing positon, the retraction mechanism 120 may further include an actuator 146, for example a winding actuator, configured to facilitate winding up of the cable 114. For example, the actuator 146 may include a cable holder 142 rotably coupled to a rotating arm of the actuator 146 so that when the actuator 146 rotates its arm, the cable holder 142 rotates to wind up of the cable 114 and pull the coupler portion 102 into the receiver 104. As such, the second end 116 of the cable 114 may be coupled to the cable holder 142.

While it is contemplated that the cable 114 may be routed directly from the coupler portion 102 to the cable holder 142, in some embodiments, and as illustrated in FIG. 2, the cable 114 may be directed around a pulley 140 or several pulleys, so as to be directed toward the cable holder 142 and actuator 146. In embodiments, the pulley 140 may be attached to a portion of the vehicle 10 such as, for example, a frame 12 of the vehicle 10. By using a pulley or system of pulleys, the actuator 146 and cable holder 142 may be positioned on a body of the vehicle 10 in a more convenient location. In some embodiments the actuator 146 and cable holder 142 may be located within a body of the vehicle 10. For example, the actuator 146 and cable holder 142 may be within a bed of a truck such that the cable 114 is routed through a floor 14 of the truck bed.

FIG. 2 also illustrates one example of a locking mechanism 130. The locking mechanism 130 is operable to lock the coupler portion 102 in the towing position. That is the locking mechanism 130 can lock the coupler portion 102 within the receiver 104 so that the coupler portion 102 will not re-extend from the receiver 104 during towing operations. In some embodiments, the locking mechanism 130 is a pin that can extend through both the receiver 104 and the coupler portion 102 to lock the coupler portion 102 to the receiver 104. However, it is contemplated that the locking mechanism 130 can take on many different forms, some of which will be described in greater detail herein. The locking mechanism 130 may be manually actuated (e.g., a pin manually inserted through the coupler portion 102 and the receiver 104) or the locking mechanism 130 may be mechanically/controllably actuated. For example, the locking mechanism 130 may have an actuator (e.g., a linear actuator) for mechanically actuating the locking mechanism 130.

Figure 3:
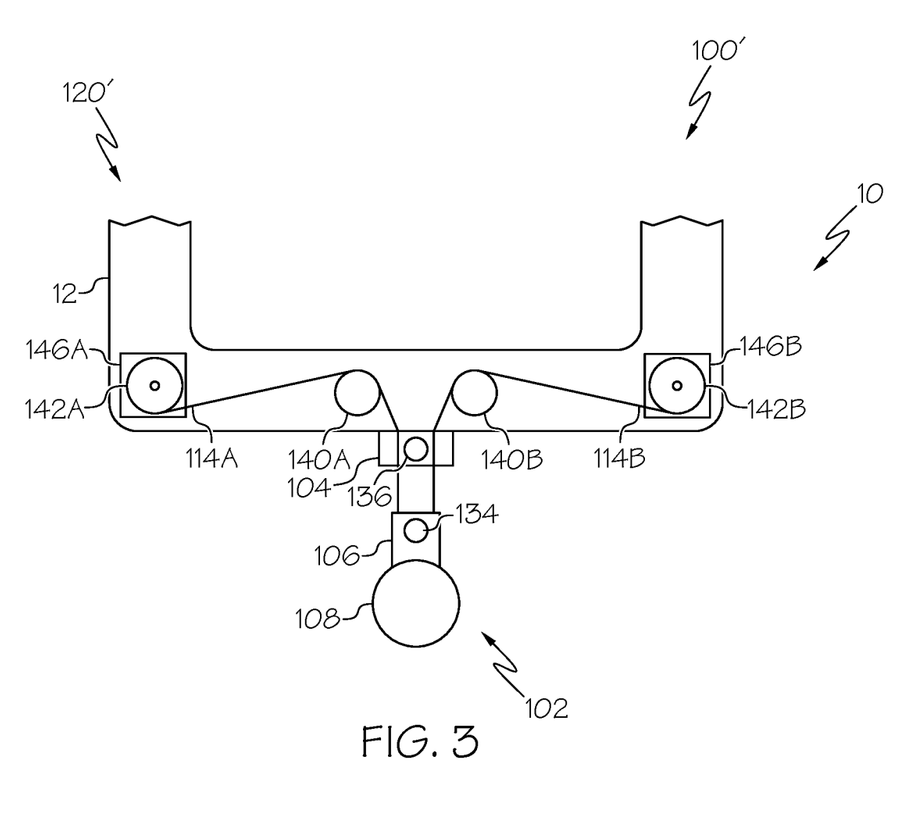
FIG. 3 depicts a towing hitch assembly, according to one or more embodiments shown and described herein.

FIG. 3 schematically illustrates a top view of another embodiment of a towing hitch assembly 100', according to embodiments disclosed herein. In this embodiment, the towing hitch assembly 100' includes two cables 114A, 114B, coupled to the coupler portion 102. The two cables 114A, 114B can be directed along a frame 12 of the vehicle 10 in opposite directions (e.g., one cable is routed to a left side of the vehicle 10 while the other cable is routed to a right side of the vehicle 10). Each cable 114A, 114B can be directed around a pulley 140A, 140B which routes the cable 114A, 114B to individual cable holders 142A, 142B that are rotated by respective actuators 146A, 146B. Such a towing hitch assembly 100' may provide a stronger pulling force for retracting the coupler portion 102 and towable item 20 coupled thereto. In some embodiments, the actuators 146A, 146B described herein can be electrical motors that receive power from a battery of the vehicle 10. In some embodiments, only one actuator may be operatively coupled to both cable holders 142A, 142B to rotate the cable holders so as to wind up the cables 114A, 114B.

Still referring to FIG. 3, a locking mechanism aperture 134 is schematically illustrated extending through the elongate frame 106 of the coupler portion 102. The receiver 104 may also include a locking mechanism aperture 136 that aligns with the locking mechanism aperture 134 of the coupler portion 102 when the coupler portion 102 is in the retracted position. Such apertures 134, 136 may allow for insertion of a pin or other locking mechanism 130 to lock the coupler portion 102 to the receiver 104 of the towing hitch assembly 100'. As noted above, in some embodiments, the locking mechanism 130 may have an actuator that allows for controlled locking of the locking mechanism 130.

Figure 4A:
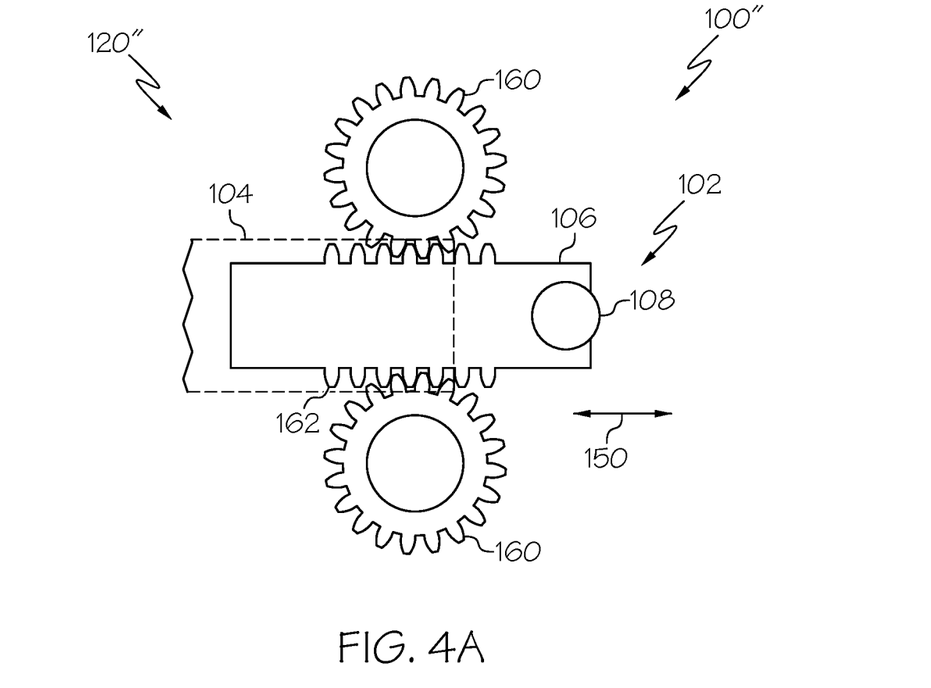
FIG. 4A depicts a top view of a towing hitch assembly, according to one or more embodiments shown and described herein.
Figure 4B:
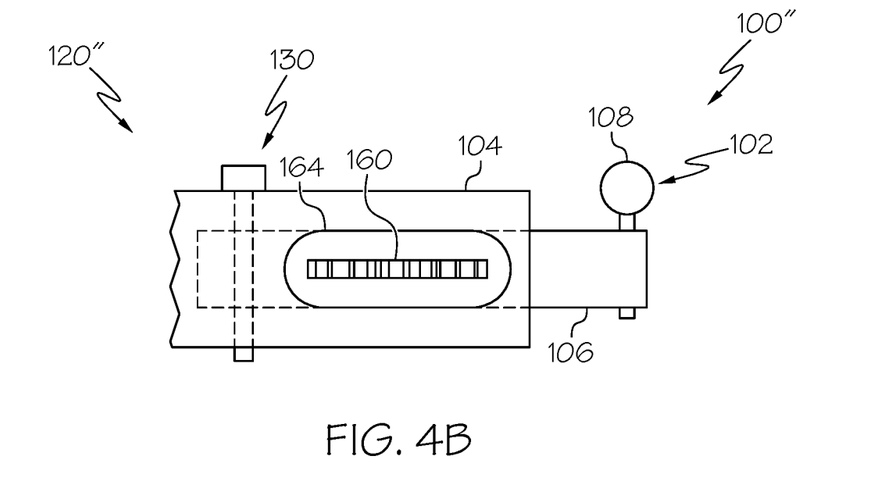
FIG. 4B depicts a side view of the towing hitch assembly of FIG. 4A, according to one or more embodiments shown and described herein.

Referring now to FIGS. 4A and 4B, another hitch assembly 100" is schematically depicted. FIG. 4A illustrates a top view of a retraction mechanism 120" and FIG. 4B illustrates a side view. In such embodiment a rack and pinion type relationship allows for retraction of the coupler portion 102. For example, the elongate frame 106 of the coupler portion may have a linear gear 162 formed thereon or attached thereto. One or more gears 160 may extend through openings 164 extending through lateral sides of the receiver 104. The one or more gears 160 can mesh with the linear gear 162. The one or more gears 160 can be driven by a motor or crank. When the one or more gears rotate they can cause the coupler portion 102 to move back and/or forth so as to extend the coupler portion 102 to an extended position and/or retract the coupler portion 102 to a towing position. As with previous embodiments, a locking mechanism 130 may be extend through the elongate frame 106 of the coupler portion 102 to lock the coupler portion 102 in a towing position.

Figure 5A:
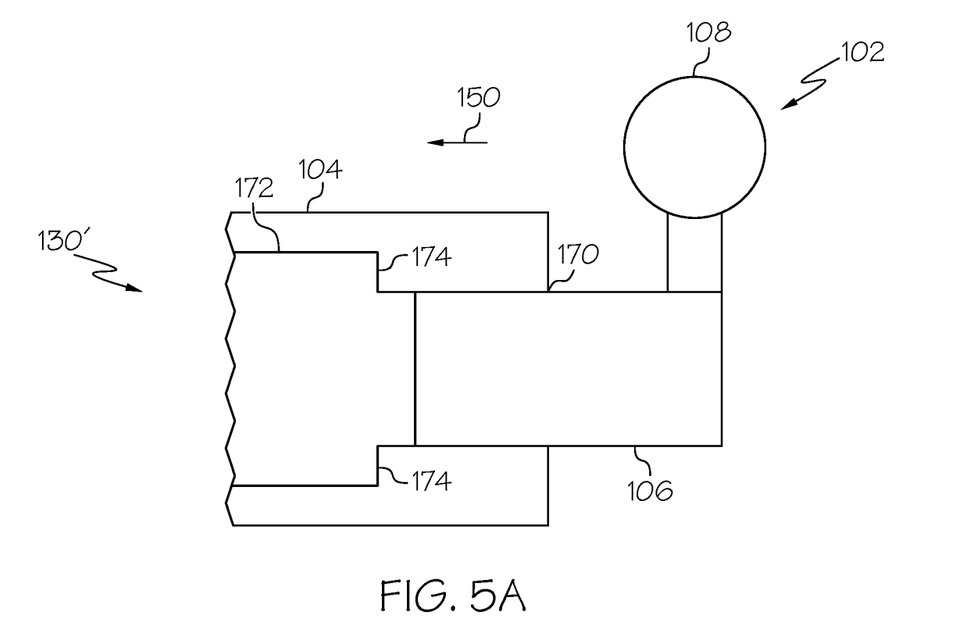
FIG. 5A depicts and side view of a towing hitch assembly, according to one or more embodiments shown and described herein.
Figure 5B:
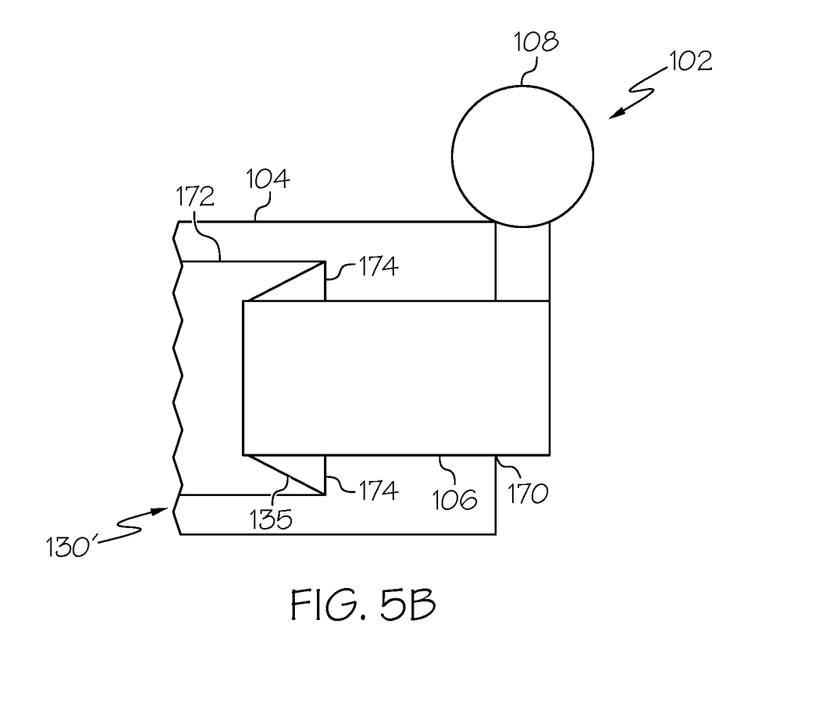
FIG. 5B depicts a locking mechanism of the towing hitch assembly of FIG. 5A according to one or more embodiments shown and described herein.

FIGS. 5A and 5B schematically illustrate an embodiment of a locking mechanism 130'. In this embodiment, the elongate frame 106 of the coupler portion 102 can include one or more collapsible tabs 135. The one or more collapsible table 135 may move between an unlocked position, wherein the one or more collapsible tabs 135 are positioned flatly against or within the elongate frame 106, and a locked position wherein the one or more collapsible tabs 135 are expanded to lock against the receiver 104. For example, the one or more collapsible tabs 135 may be rotatably coupled to the elongate frame 106. In some embodiments, the one or more collapsible tabs 135 may be spring loaded to rotate and expand to the locked position when the coupler portion 102 has been retracted to the towing position, as illustrated in FIG. 5B. To create a locking configuration between the one or more collapsible tabs and the receiver, the receiver 104 may include an opening 170 that has enlarged region 172 such that a ledge 174 is formed between the opening 170 and the enlarged region 172. As the coupler portion 102 is retracted into the receiver 104 the coupler portion 102 can pass from the opening 170 of the receiver 104 into the enlarged region 172. Once the coupler portion 102 reaches the towing position, the one or more collapsible tabs 135 can expand to the locked position so as to interface with the ledge 170. In this way, the coupler portion 102 cannot be withdrawn from the receiver 104. In some embodiments, there may be a button or other device operable to re-collapse the collapsible tabs 135 so that the coupler portion 102 may be withdrawn from the receiver 104.

Figure 6:
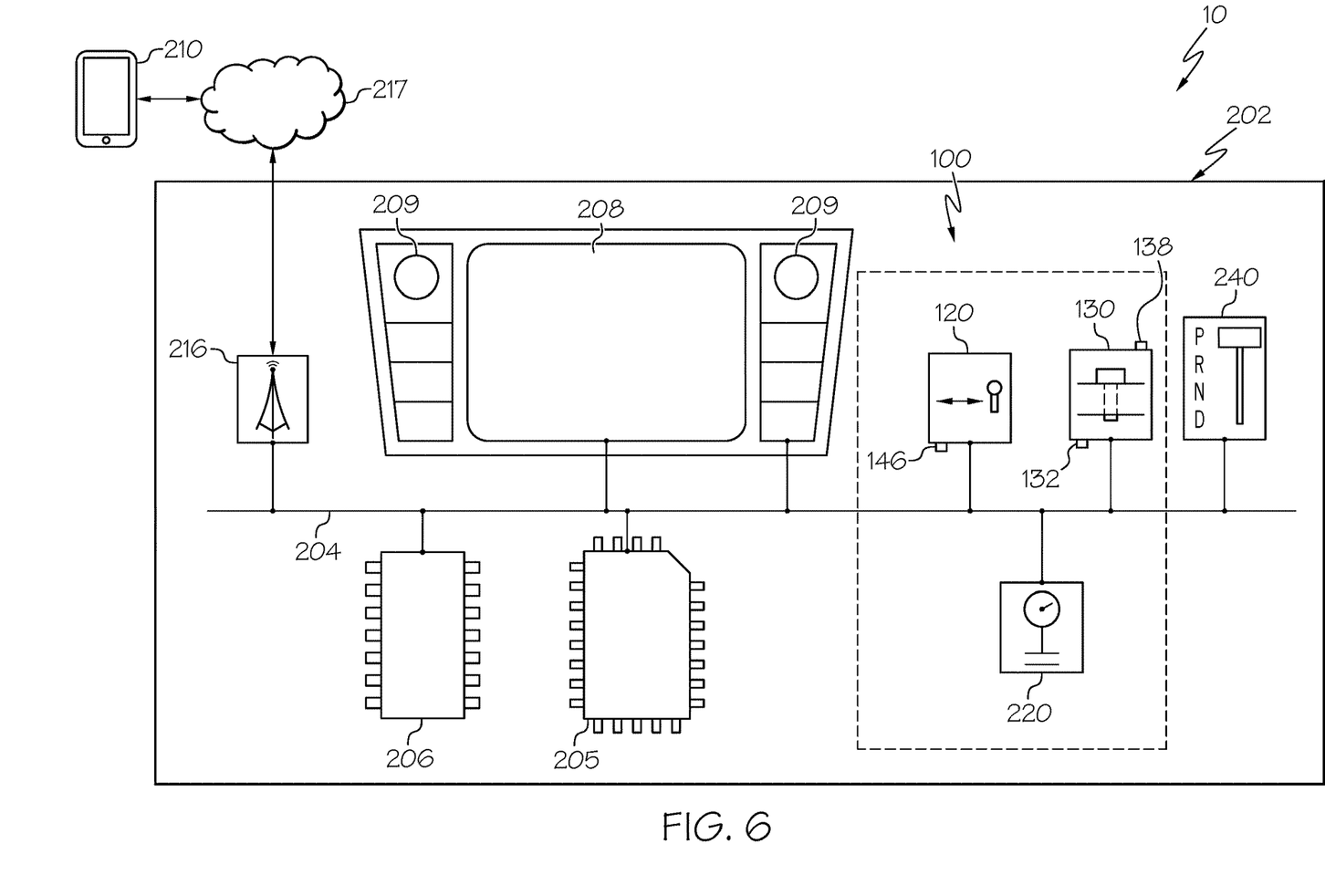
FIG. 6 schematically depicts a system for controlling a towing hitch assembly, according to one or more embodiments shown and described herein.

Referring now to FIG. 6, a system 202 for controlling the towing hitch assembly 100 is schematically depicted. The system 202 includes a communication path 204, a processor 205, a memory module 206, a retraction mechanism 120, a user input device 209, a locking mechanism 130, a display 208, network interface hardware 216, a driving control system 240, and a towable item load sensor 220.

As described above, the system 202 includes a communication path 204 that provides data interconnectivity between various modules disposed within the system 202. Specifically, each of the modules can operate as a node that may send and/or receive data. In some embodiments, the communication path 204 includes a conductive material that permits the transmission of electrical data signals to processors, memories, sensors, and actuators throughout the system 202. In another embodiment, the communication path 204 can be a bus, such as for example a LIN bus, a CAN bus, a VAN bus, and the like. In further embodiments, the communication path 204 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 202 includes the processor 205 communicatively coupled with the memory module 206 over the communication path 204. The processor 205 may include any device capable of executing machine-readable instructions stored on a non-transitory computer-readable medium. The processor 205 may include one or more processors 205. Accordingly, each processor 205 may include a controller, an integrated circuit, a microchip, a computer, and/or any other computing device.

The memory module 206 is communicatively coupled to the processor 205 over the communication path 204. The memory module 206 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 202 and/or external to the system 202. The memory module 206 may be configured to store one or more pieces of logic, as described in more detail below. The memory module 206 may include one or more memory modules 206. The embodiments described herein may utilize a distributed computing arrangement to perform any portion of the logic described herein.

Embodiments of the present disclosure include logic stored on the memory module 206 that includes machine-readable instructions and/or an algorithm written in any programming language of any generation (e.g., 1GL, 2GL, 3GL, 4GL, and/or 5GL) such as, machine language that may be directly executed by the processor 205, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As described herein with reference to FIGS. 1A-4B, the vehicle 10 includes a retraction mechanism 120 that is operable to retract the coupler portion 102 of the towing hitch assembly 100 from an extended position, wherein at least a portion of the coupler portion 102 is positioned away from a bumper 18 the vehicle 10, to a towing position. The retraction mechanism 120 includes an actuator 146 (e.g., a motor) that is operable to cause the retraction mechanism 120 to retract the coupler portion 102. The retraction mechanism 120 can be communicatively coupled over the communication path 204 to the processor 205 such that the processor 205 can execute logic stored on the memory 206 to retract the coupler portion 102 of the towing hitch assembly 100 with the retraction mechanism 120 to the towing position. In some embodiments, it is contemplated the retraction mechanism 120 may also be operable to extend the coupler portion 102 to the extended position as described here.

As noted herein, the system 202 includes the user input device 209 coupled to the communication path 204 such that the communication path 204 communicatively couples the user input device 209 to other modules of the system 202. The user input device 209 may be any device capable of transforming mechanical, optical, or electrical signals into a data signal capable of being transmitted with the communication path 204. Specifically, the user input device 209 may include any number of movable objects that transform physical motion into a data signal that can be transmitted over the communication path 204 such as, for example, a button, a switch, a knob, a microphone or the like. In some embodiments, a display 208 and the user input device 209 are combined as a single module and operate as an audio head unit or an infotainment system within the vehicle 10. However, it is noted, that the display 208 and the user input device 209 may be separate from one another. The user input device 209 may allow a vehicle operator to retract, with the retraction mechanism 120, the coupler portion 102 of the towing hitch assembly 100 to a towing position. The user input device 209 may also allow a vehicle operator to lock or unlock the locking mechanism 130. In some embodiments, it is contemplated that the user input device 209, or one of multiple user input devices, may be located on or near the towing hitch assembly 100. For example, a user input device 209 for controlling the retraction mechanism 120 and/or the locking mechanism 130 may be located near a tailgate (e.g., on a bumper) of the vehicle 10 adjacent to the towing hitch assembly 100. This may allow a user to easily lock or unlock the locking mechanism 130 and control the retraction mechanism 120 to retract to coupler portion 102 of the towing hitch assembly 100 without having to walk away from the towing hitch assembly 100 and towable item 20 (Shown in FIGS. 1A-1D).

In some embodiments, the system 202 further includes network interface hardware 216 for communicatively coupling the system 202 with a network 217. The network interface hardware 216 can be communicatively coupled to the communication path 204 and can be any device capable of transmitting and/or receiving data via the network 117. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth wireless communication protocol. In another embodiment, network interface hardware 216 may include a Bluetooth send/receive module for sending and receiving Bluetooth communications to/from a mobile device 210.

The system 202 may communicate, through the network interface hardware 216, with a network 217 to communicatively couple the system 202 with the mobile device 210. In one embodiment, the network 217 is a personal area network that utilizes Bluetooth technology to communicatively couple the system 202 and the mobile device 210. In other embodiments, the network 217 may include one or more computer networks (e.g., a personal area network, a local area network, or a wide area network), cellular networks, satellite networks and/or a global positioning system and combinations thereof. Accordingly, the system 202 can be communicatively coupled to the network 217 via wires, via a wide area network 217, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 210 may be included as a user input device for controlling the retraction mechanism 120 and/or the locking mechanism 130. The mobile device 210 may include a processor and a memory module. The processor of the mobile device 210 can execute logic to communicate with the system 202 in order to facilitate sending instructions to the system 202 from the mobile device 210 to retract (or extend) the coupler portion 102 with the retraction mechanism 120. In some embodiments, the processor of the mobile device 210 can execute logic to communicate with the system 202 in order to facilitate sending instructions to the system 202 from the mobile device 210 to lock and/or unlock the locking mechanism 130. The mobile device 210 may be configured with wired and/or wireless communication functionality for communicating with the system 202. In embodiments described herein, the mobile device 210 may include mobile phones, smartphones, personal digital assistants, dedicated mobile media players, mobile personal computers, laptop computers, and/or any other mobile devices capable of being communicatively coupled with the system 202. It is noted, that in this embodiment, the system 202 may communicate with the mobile device 210 even while the mobile device 210 is outside of a cabin of the vehicle 10. In this way, the towing hitch assembly 100 can be controlled from outside of the vehicle 10.

The system 202 may further include a display 208 for providing visual output such as, for example, maps, navigation, entertainment, information, image data from a rear view camera, or a combination thereof. The display 208 is coupled to the communication path 204. Accordingly, the communication path 204 communicatively couples the display 208 to other modules of the system 202. The display 208 may include any medium capable of transmitting an optical output such as, for example, a cathode ray tube, light emitting diodes, a liquid crystal display, a plasma display, or the like. Moreover, the display 208 may be a touchscreen that, in addition to providing optical information, detects the presence and location of a tactile input upon a surface of or adjacent to the display 208. Accordingly, the display 208 may receive mechanical input directly upon the optical output provided by the display 208. As such, the display 208 may be included as a user input device 209. Additionally, it is noted that the display 208 can include a processor and a memory module.

As described herein with reference to FIGS. 1A-5B, the vehicle 10 includes a locking mechanism 130 that is operable to lock the coupler portion 102 of the towing hitch assembly 100 in a towing position (e.g., where the coupler portion 102 is retracted into the receiver 104). The locking mechanism may include an actuator 132 (e.g., a motor) that is operable to cause the locking mechanism 130 to lock the coupler portion 102 within or to the receiver 104. The locking mechanism 130 can be communicatively coupled over the communication path 204 to the processor 205 such that the processor 205 can execute logic stored on the memory 206 to move the locking mechanism 130 between a locked position and an unlocked position. It is noted that in some embodiments, the locking mechanism 130 may not be communicatively coupled to other modules of the system 202. Instead, the locking mechanism 130 may be manually actuated.

In some embodiments, the locking mechanism 130 may include a lock engagement sensor 138 configured to output a signal indicative of a locking status of the locking mechanism 130. Such lock engagement sensor 138 may include a camera, proximity sensor, pressure sensor, and the like. For example, the lock engagement sensor 138 may be communicatively coupled to the processor 205 that outputs a signal indicative of whether or not the locking mechanism 130 is in an unlocked position. In some embodiments, the processor 205 can execute logic to prohibit the vehicle 10 from being place in a driving mode (e.g., forward, reverse, and the like) when it is determined that the locking mechanism 130 is in an unlocked condition. In some embodiments, the processor 105 can execute logic to output a status indication of the locking mechanism 130. That is the processor 105 can execute logic to output a signal (such as a graphic on the display 208) to indicate a locking status of the locking mechanism 130.

To prevent the vehicle 10 from being placed in a driving mode when it is determined that the locking mechanism 130 is in an unlocked condition, the system 202 may further include a driving control system 240. The driving control system 240 may include various vehicle systems that allow the vehicle 10 to be placed in a driving mode. For example, the driving control system 240 may include a vehicle propulsion system that can control the engine, motor, transmission, and/or other vehicle controls that are used for driving the vehicle 10. The driving control system 240 can control a gear shifter to prevent the vehicle from being placed in a drivable condition when the locking mechanism 130 is in an unlocked condition (e.g., as determined based on a signal output by the lock engagement sensor 138).

In some embodiments, the system 202 may further include a towable item load sensor 220 that is communicatively coupled over the communication path 204 to other modules of the system 202. The towable item load sensor may be operatively coupled to the retraction mechanism 120 and may output a signal indicative of a load experienced by the retraction mechanism 120. For example, the towable item load sensor 220 may be a gauge coupled to a motor of the retraction mechanism 120 that indicates the force the motor must generate to retract the coupler portion 102 and the towable item 20 (such as shown in FIGS. 1A-1D). The memory module 206 can store predetermined load limits that the retraction mechanism 120 may support. When, based on a signal from the towable item load sensor 220, the towable item load sensor 220 indicates that the force necessary to retract the coupler portion 102 and the towable item 120 exceeds the predetermined load limit, the processor 205 can execute logic to output a notification (such as a graphic on the vehicle display 208 or an audible warning over a vehicle speaker) to warn the user that the towable item 20 exceeds the predetermined load limit and that the retraction mechanism 120 is not capable of bringing the towable item into engagement with the vehicle 10 through the towing hitch assembly 100.

It should now be understood that embodiments of the present disclosure are directed to a vehicle that includes a retractable towing hitch assembly. Having a retractable towing hitch assembly, as provided herein, allows a user to easily couple a towable item to the towing hitch assembly of the vehicle. For example, a towing hitch assembly as described herein can be extended to an extended position wherein it can be pre-coupled to a coupler of a towable item. The vehicle can then retract the towing hitch assembly from the extended position so as to pull the towing hitch assembly and the towable item, to a towing position wherein the vehicle can tow the towable item. Hence, a vehicle operator can more easily align the towing hitch assembly and the towable item saving time and energy.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising a towing hitch assembly comprising:
   a coupler portion, wherein the coupler portion is configured to be movable relative to a bumper of the vehicle such that the coupler portion is positioned farther from the bumper when the coupler portion is in an extended position than when the coupler portion is in a towing position;
   a locking mechanism operable to lock the coupler portion in the towing position; and
   a lock engagement sensor that outputs a signal indicative of whether or not the locking mechanism is in an unlocked position;
   a processor communicatively coupled to the lock engagement sensor; and
   a memory module communicatively coupled to the processor storing logic that, when executed, causes the processor to:
      determine, based on the signal of the lock engagement sensor, whether or not the locking mechanism is in the unlocked position.

2. The vehicle of claim 1, further comprising a retraction mechanism operatively coupled to the towing hitch assembly and configured to retract the coupler portion of the towing hitch assembly to the towing position.

3. The vehicle of claim 2, wherein, when executed, the logic causes the processor to:
   retract the coupler portion of the towing hitch assembly with the retraction mechanism to the towing position.

4. The vehicle of claim 3, further comprising a user input device communicatively coupled to the processor that allows a vehicle operator to instruct the processor to retract the coupler portion of the towing hitch assembly with the retraction mechanism.

5. The vehicle of claim 2, wherein, when executed, the logic causes the processor to lock the coupler portion in the towing position with the locking mechanism.

6. The vehicle of claim 5, further comprising a user input device communicatively coupled to the processor that allows a vehicle operator to instruct the processor to do at least one of:
   retract the coupler portion of the towing hitch assembly with the retraction mechanism; and
   move the locking mechanism between a locked position and an unlocked position.

7. The vehicle of claim 1, further comprising:
   a driving control system communicatively coupled to the processor,
   wherein the processor executes logic to prohibit, with the driving control system, the vehicle from being placed in a drivable condition when the locking mechanism is in the unlocked position.

8. The vehicle of claim 1, wherein:
   the towing hitch assembly comprising:
      a toothed rack that is at least one of formed on an outer surface of the coupler portion and coupled to the outer surface of the coupler portion; and
   the vehicle comprising a retraction mechanism comprising a gear configured to engage the toothed rack to move the coupler portion to reduce a distance between the coupler portion and the bumper of the vehicle when the coupler portion is moved from the extended position to the towing position.

9. The vehicle of claim 8 wherein:
   the processor is communicatively coupled to the retraction mechanism; and
   the memory module communicatively coupled to the processor further stores logic that, when executed by the processor, causes the gear to traverse the toothed rack to reduce the distance between the coupler portion and the bumper the vehicle.

10. The vehicle of claim 8, further comprising a user input device communicatively coupled to the processor that allows a vehicle operator to instruct the processor to do at least one of:
    retract the coupler portion with the gear; and
    move the locking mechanism between a locked position and the unlocked position.

11. The vehicle of claim 8, further comprising:
    a driving control system communicatively coupled to the processor,
    wherein
    the processor executes logic to prohibit, with the driving control system, the vehicle from being placed in a drivable condition when the locking mechanism is in the unlocked position.

12. The vehicle of claim 8, further comprising a receiver, wherein the coupler portion is positioned within the receiver, and the gear engages the coupler portion through an opening formed within a sidewall of the receiver.

13. A vehicle, comprising:
    a towing hitch assembly comprising:
       a coupler portion configured to be movable relative to a bumper of the vehicle such that the coupler portion is positioned farther from the bumper when the coupler portion is in an extended position than when the coupler portion is in a towing position; and
       a cable having a first end and a second end;
    a retraction mechanism comprising a winding actuator configured to wind the cable such that a distance between the coupler portion and the bumper of the vehicle is reduced when the coupler portion is moved from the extended position to the towing position, wherein the first end of the cable is coupled to the coupler portion and the second end of the cable is coupled to the retraction mechanism;
    a locking mechanism operable to lock the coupler portion in the towing position;
    a lock engagement sensor that outputs a signal indicative of whether or not the locking mechanism is in an unlocked position;
    a processor communicatively coupled to the lock engagement sensor; and
    a memory module communicatively coupled to the processor storing logic that, when executed, causes the processor to:
    determine, based on the signal of the lock engagement sensor, whether or not the locking mechanism is in the unlocked position.

14. The vehicle of claim 13, wherein, when executed, the logic causes the processor to wind the cable with the winding actuator to reduce the distance between the coupler portion and the bumper of the vehicle.

15. The vehicle of claim 14, wherein the locking mechanism is communicatively coupled to the processor.

16. The vehicle of claim 15, further comprising a user input device communicatively coupled to the processor that allows a vehicle operator to instruct the processor to do at least one of:
    retract the coupler portion with the winding actuator; and
    move the locking mechanism between a locked position and an unlocked position.

17. The vehicle of claim 15, further comprising:
a driving control system communicatively coupled to the processor,
wherein the processor executes the logic to prohibit, with the driving control system, the vehicle from being placed in a drivable condition when the locking mechanism is in the unlocked position.

18. The vehicle of claim 14, further comprising a user input device communicatively coupled to the processor that allows a vehicle operator to instruct the processor to retract the coupler portion with the winding actuator.

* * * * *

UNITED STATES PATENT AND TRADEMARK OFFICE
CERTIFICATE OF CORRECTION

| | |
|---|---|
| PATENT NO. | : 11,383,567 B2 |
| APPLICATION NO. | : 15/788513 |
| DATED | : July 12, 2022 |
| INVENTOR(S) | : Coh Yoshizaki |

It is certified that error appears in the above-identified patent and that said Letters Patent is hereby corrected as shown below:

On the Title Page

In Item (73) Assignee: delete "Erlanger, KY (US)" and insert -- Plano, TX (US) --, therefor.

Signed and Sealed this
Eighth Day of November, 2022

Katherine Kelly Vidal
*Director of the United States Patent and Trademark Office*